United States Patent
George

(10) Patent No.: US 8,056,692 B2
(45) Date of Patent: Nov. 15, 2011

(54) SEALING SYSTEM AND WET-RUNNING DUAL-CLUTCH SYSTEM WITH A SEALING SYSTEM

(75) Inventor: Philip George, Wooster, OH (US)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 824 days.

(21) Appl. No.: 12/150,965

(22) Filed: May 2, 2008

(65) Prior Publication Data

US 2008/0277228 A1    Nov. 13, 2008

Related U.S. Application Data

(60) Provisional application No. 60/927,300, filed on May 2, 2007.

(51) Int. Cl.
*F16D 25/10* (2006.01)
*F16D 25/12* (2006.01)

(52) U.S. Cl. .............. 192/48.619; 192/85.44; 277/437

(58) Field of Classification Search ............ 192/48.619, 192/85.44, 85.54; 277/435, 437–439, 451, 277/454, 586

See application file for complete search history.

(56) References Cited

U.S. PATENT DOCUMENTS

| | | | |
|---|---|---|---|
| 3,000,478 A * | 9/1961 | Carter | 192/18 A |
| 3,848,518 A * | 11/1974 | Martin | 92/107 |
| 4,724,941 A * | 2/1988 | Wirkner | 192/52.2 |
| 4,957,195 A * | 9/1990 | Kano et al. | 192/106 F |
| 6,158,744 A | 12/2000 | Jones et al. | |
| 2008/0271968 A1 * | 11/2008 | Metzinger et al. | 192/48.8 |

\* cited by examiner

*Primary Examiner* — Richard M. Lorence
(74) *Attorney, Agent, or Firm* — Davidson, Davidson & Kappel, LLC

(57) ABSTRACT

A sealing system with at least one sealing device for a pressurizing-agent-operable actuating device, for sealing off a pressure chamber assigned to the latter from the surroundings. The individual sealing element being placed in a groove formed by the actuating device and a thin sheet metal element connected to the actuating device, where at least two contact surfaces that describe the groove are formed on the actuating device for the sealing element.

25 Claims, 6 Drawing Sheets

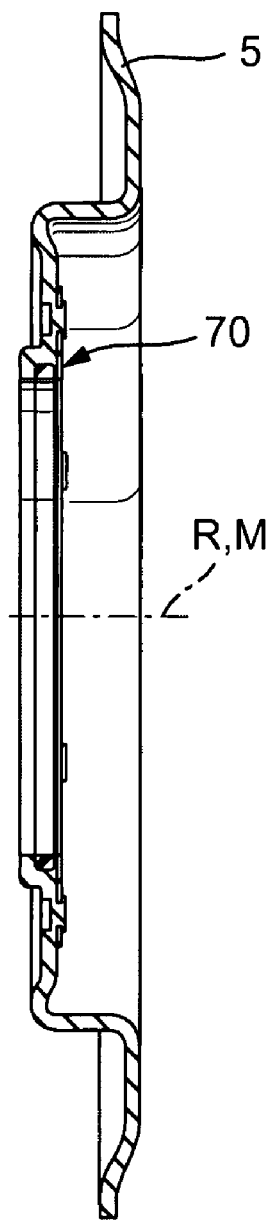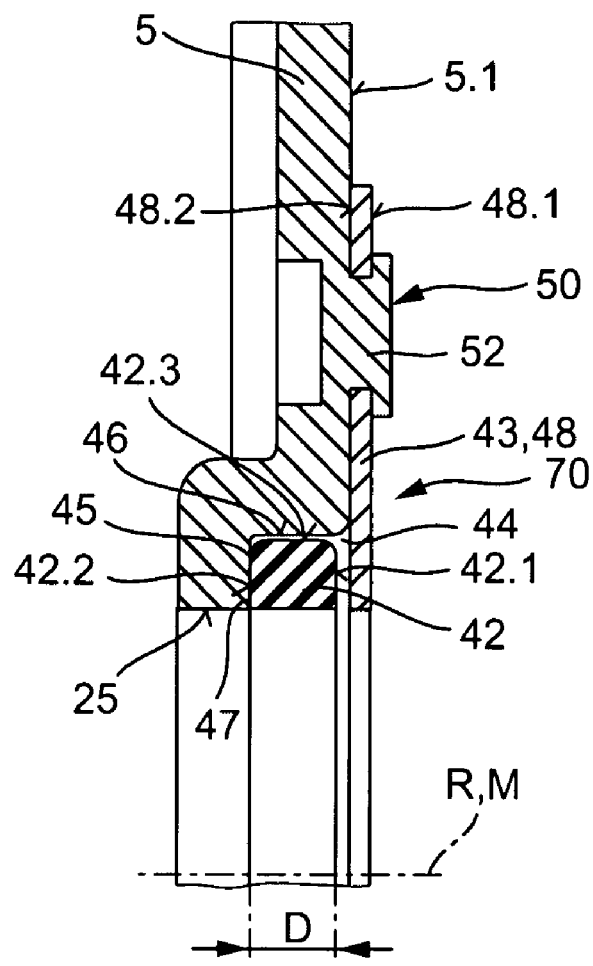
Fig. 1a
Fig. 1b

State of the Art

State of the Art

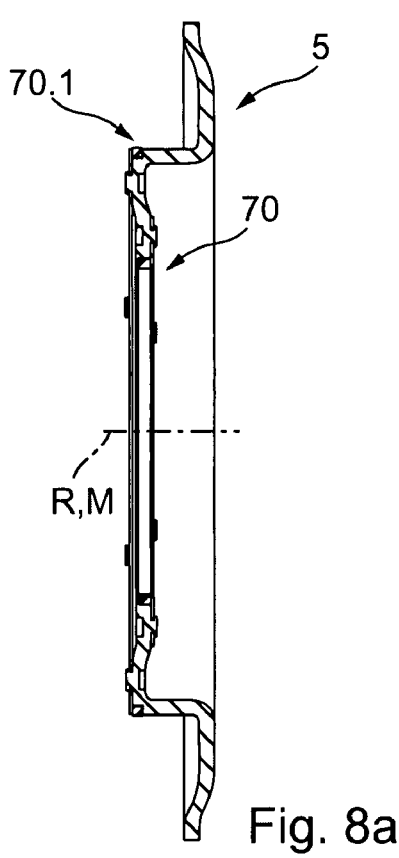 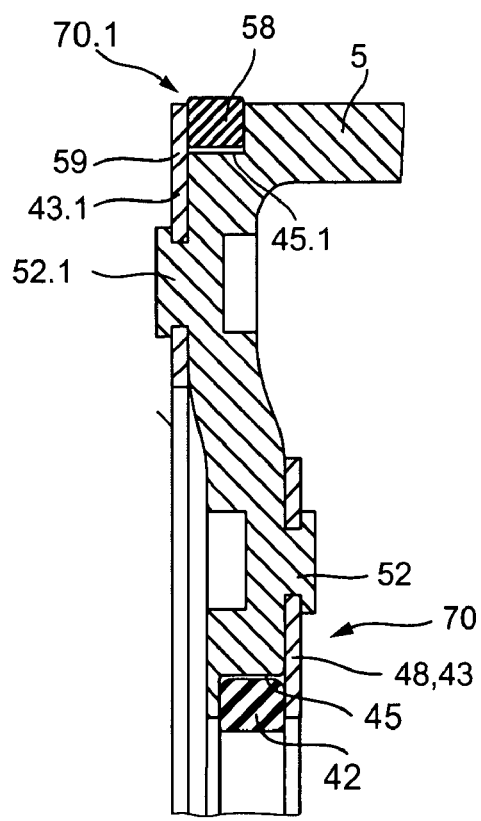
Fig. 8a    Fig. 8b
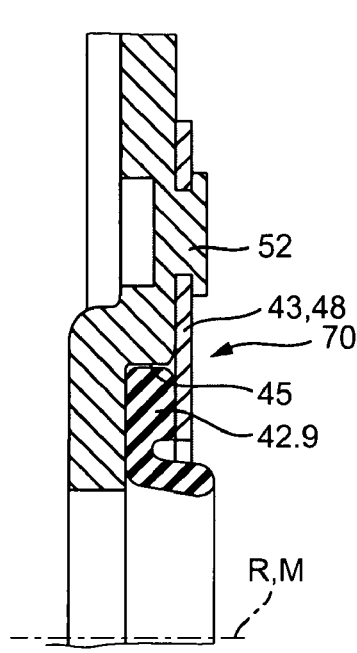 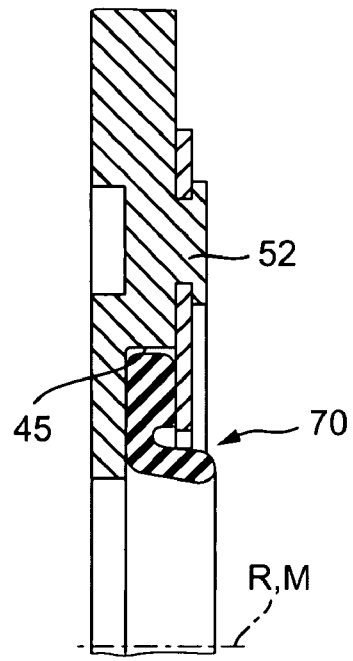
Fig. 9    Fig. 10

SEALING SYSTEM AND WET-RUNNING DUAL-CLUTCH SYSTEM WITH A SEALING SYSTEM

Priority to U.S. Provisional Patent Application Ser. No. 60/927,300, filed May 2, 2007 is claimed, the entire disclosure of which is hereby incorporated by reference herein.

The invention relates to a sealing system with at least one sealing device for a pressurizing-agent-operable actuating device, for sealing off a pressure chamber assigned to the latter from the surroundings; furthermore, a wet-running dual-clutch system with a sealing system.

BACKGROUND

Wet-running dual-clutch systems are already known in a plurality of versions from the existing art. These have one input and two outputs, the input being formed of a driver unit, which is connected to a first clutch part of each of the individual clutch systems of the wet-running double clutch. Each clutch system has a second clutch part, which may be brought into operative connection with the first clutch part and is coupled with the respective output in a rotationally fixed connection. Such clutch designs are frequently of multi-disk or lamellar construction, so that the first clutch part is formed of a first lamellar array and the second clutch part is formed of a second lamellar array, where the two lamellar arrays may be brought into a frictionally engaged operative connection with each other by means of an actuating device, usually in the form of a piston element actuated by a pressurizing agent. For this purpose, each of the clutch systems has its own actuating device, preferably in the form of a piston element. Assigned to the piston element for actuation is at least one chamber pressurizable with a pressurizing agent, but preferably two chambers pressurizable with a pressurizing agent, which act on the two faces of the piston element directed away from each other, and where a first of the chambers pressurizable with a pressurizing agent serves directly as a pressure chamber for operating the piston, and the second chamber assigned to a piston element serves as a compensating chamber. The chambers are connected to a pressurizing agent supply and conducting system, with the individual chambers assigned to a piston element being separately addressable. The contact force of the piston can be set by means of the pressure difference in the two chambers. Due to the wet operation of the lamella, which are always running in oil, the chambers which are pressurizable with a pressurizing agent must be separated from the interior space of the wet-running dual clutch. The individual clutch systems are situated coaxially to each other and one inside the other in the radial direction, and preferably with little or no offset in relation to each other in the axial direction. The sealing of the individual chambers in relation to the interior space or to each other is accomplished by means of sealing systems comprising elastic sealing devices, these being moving sealing devices in this case, since they usually seal the piston in relation to a stationary component, and the sealing surface is moved along with the motion of the piston. The sealing systems are therefore normally vulcanized directly onto the piston element. This means that to apply the sealing device, the entire piston element—and thus a relatively large component which in some versions has a cross section with complex geometry—must be handled and subjected to the vulcanizing process. The geometry of the piston determines both the arrangement of the sealing device and the arrangement and form of the other surface areas of the chamber pressurizable with a pressurizing agent which are to be brought into operative connection with the sealing device. Highly precise fabrication is therefore necessary to realize a reliable sealing function. Furthermore, if the sealing surfaces are damaged there is no simple means of replacing the individual sealing devices.

A different version consists in the incorporation of grooves in the piston element, or an element that bounds the chamber which is pressurizable with pressurizing agent. The form of the groove cross sections must be included in the considerations when designing the cross sectional areas of the elements containing the groove, so that these must be executed with relatively great thickness.

A sealing device for sealing between coaxial components, in particular a drilled hole and a rotationally symmetrical element that is movable in the latter, is already known from published patent application U.S. Pat. No. 6,158,744. The sealing device is placed in a groove in this case, and is prestressed in the groove in the axial direction by a ring-shaped tensioning element.

SUMMARY OF THE INVENTION

An object of the invention is to provide a sealing system for use in clutch systems of any desired construction type, in particular in dual clutch systems, which is characterized by a simple design independent of the design of the piston and is easily replaceable.

A sealing system with at least one sealing device for a pressurizing-agent-operable actuating device, for sealing off a pressure chamber assigned to the latter from the surroundings, in particular from the inner space of a clutch system when used in clutch systems, the individual sealing device may be placed in a groove formed by the actuating device and a thin sheet metal element connected to the actuating device, where the sheet metal element merely forms a contact surface for the sealing device, and the areas that make the groove are formed substantially in the actuating device. The sealing devices may be inserted into recesses on the actuating device merely in the edge area to make groove-forming areas and to secure them in the axial direction on the low-pressure side of the sealing element by means of a sheet metal element. As a result, the sealing element can be supported in the direction of pressure effect on the thicker construction element of the actuating device, in particular a piston element, while in the area facing away from the direction of pressure effect, and thus where the demand from the sealing element is smaller, the contact surface on the sheet metal element can be executed on a very thin sheet metal element. The invention offers the advantage that the control element does not have to be weakened unnecessarily for the groove, but at the same time there is optimal support for the sealing device in the axial direction. Furthermore, the individual sealing device is easily replaceable because there is no longer a materially joined connection with the particular connecting element, which is of major importance for purposes of servicing.

The sheet metal element can be very thin. Very thin means that the ratio of the thickness D of the sheet metal element to the thickness of the actuating device in the area that forms the groove is from 1:5 to 1:7, or that the thickness of the sheet metal element is preferably in the range from 0.5 to 1.5 mm.

Because of the recess formed on a flat contact surface to receive the sealing element, the area on the actuating device that forms the groove may be characterized by forming an axial and a radial contact surface. The sheet metal element may then be provided merely to form another radial or axial contact surface, with the corresponding function being determined by the function of the seal, in particular whether it is a radial or an axial seal.

The contact surfaces on the actuating device that form the groove may be formed along with the shaping of the actuating device. This can take place for example during the manufacturing process during the original forming, for example casting, or else during the advanced forming by reshaping, in particular blocking or deep drawing. Also conceivable however is metal-removing processing to indent the areas that form the groove, for example punching. In that case, areas that form the groove are made on a surface that forms an inner circumference or an outer circumference, or an area that forms a surface oriented in the axial direction. For radial seals, areas that form the groove may be executed on the actuating device on a sub-area that forms either an inner circumference or an outer circumference. For axial seals, the areas that form the groove may be formed on an end face of the actuating device.

In the simplest case, the sheet metal element may be implemented merely as a flat element in the form of a ring disk, which is situated coaxially to the actuating device. The connection between the individual sheet metal element and the disk is preferably non-rotatable, so that there are no relative movements between the sealing element and the sheet metal element. The rotationally fixed connection can be separable, for example by friction fit or positive lock. This offers the advantage that in particular when changing the sealing ring there is no need to compress the sealing device or stretch it beyond its diameter, but rather the sealing ring can be inserted unstressed. Non-separable connections are also conceivable, however. In that case they can be positively locked or materially joined. In the first-named case, the preferred case is a riveted joint. The riveted joint can be produced by separate rivets. Extrusion of rivets from the actuating device is also conceivable, however. An example of a materially joined connection is a spot welded joint. In that case, the individual connections are preferably distributed at uniform intervals in the circumferential direction at a diameter.

In accordance with an especially preferred embodiment of the invention, a connection is produced that may be continuous in the circumferential direction. Because of the sealed edge that this produces, in this case leakage through the connection of the sheet metal element with the actuating device may be reliably prevented.

The connection area between the sheet metal element and the actuating device, in particular the piston element itself, is preferably situated in immediate spatial proximity to the area of contact of the sheet metal element on the sealing device.

An especially advantageous embodiment of the invention provides a dual-clutch system with at least one input and two outputs and with two clutch devices situated between them, with each having an input part and an output part that can be brought into operative connection by a pressure-agent-operated actuating device. At least one chamber that may be pressurizable with a pressurizing agent assigned to the actuating device. The sealing of an individual chamber that is pressurizable with a pressurizing agent may be accomplished by situating a sealing device as described above between the actuating device and a housing wall of the chamber.

BRIEF DESCRIPTION OF THE DRAWINGS

The solution according to the invention will be explained below on the basis of figures. They depict the following details:

FIGS. 1a and 1b show a first embodiment according to the invention of a sealing device according to the invention on the basis of axial sections through an actuating device;

FIGS. 8a and 8b show a version with two sealing systems on the basis of an axial section and an enlarged depiction of a detail from the axial section;

FIG. 9 shows a possible design of a sealing device with a U-shaped element on the basis of a detail from an axial section of an actuating device;

FIG. 10 show an additional version according to FIG. 9 with a U-shaped element;

DETAILED DESCRIPTION

Figure 2A:
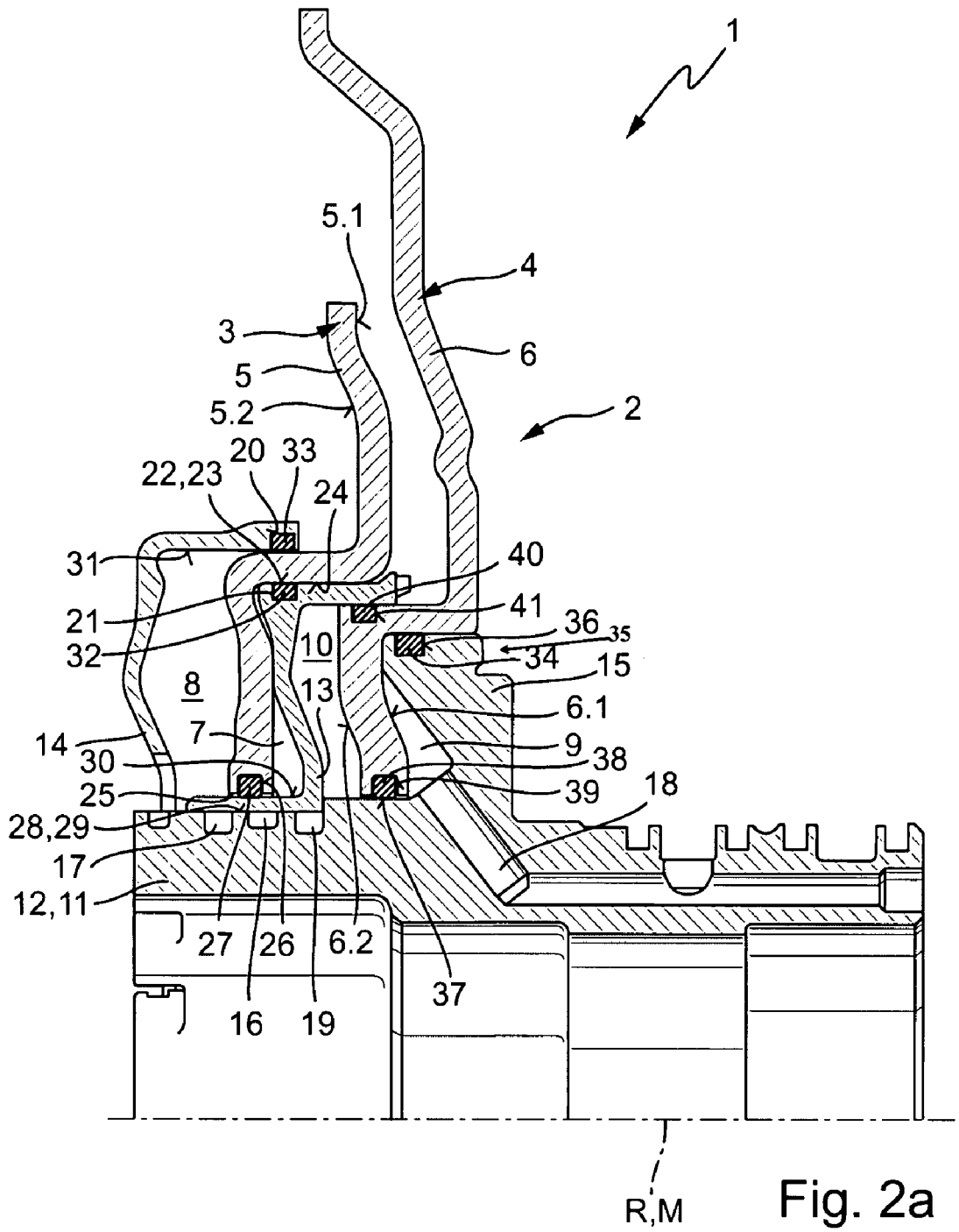
FIGS. 2a and 2b show the basic problems of versions of sealing systems according to the existing art on the basis of an axial section through an actuating unit of a dual-clutch system.
Figure 2B:
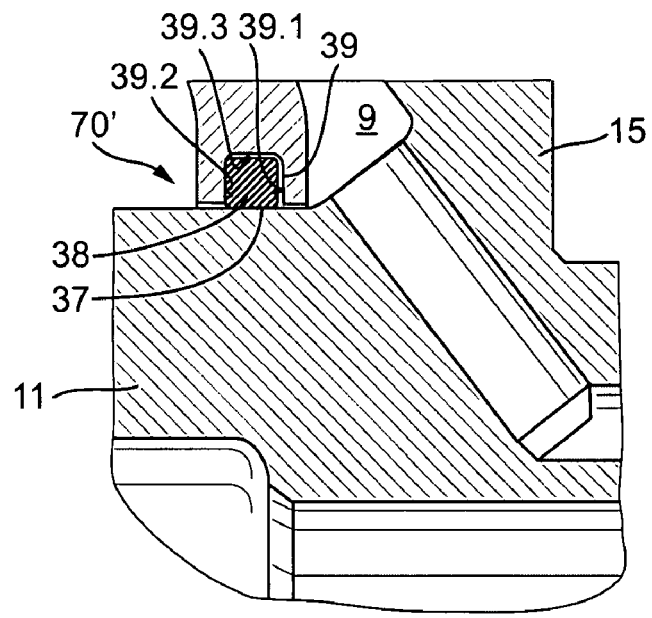

FIGS. 2a and 2b show the problems of a sealing concept used in the existing art in a simplified schematic representation on the basis of a detail from an axial section through an actuating unit 1 of a wet-running dual-clutch system 2. Wet-running dual-clutch system 2 includes two clutch units, which are preferably situated one inside the other in the radial direction and are free of offset in the axial direction or are offset only slightly from each other, with each of the individual clutch units being connectable to an input of the wet-running dual-clutch system 2 and each also being connectable to an output. The coupling takes place through the individual clutch parts of the individual clutch units, by bringing them into operative connection with each other. In wet-running dual-clutch systems the individual clutch units are normally constructed as multi-plate clutches, each comprising a first system of lamellae connected to the input in a rotationally fixed connection and a second system of lamellae connected to the respective output in a rotationally fixed connection; these can be brought into operative connection with each other by actuating unit 1. To that end, a separate actuating device is assigned to each clutch unit, an actuating device 3 and an actuating device 4, which are combined in actuating unit 1, with each of the actuating devices 3 and 4 having a piston element 5 or 6 respectively that is operable with a pressurizing agent. To that end the individual piston elements 5 and 6 are pressurized with pressurizing agent, for which reason they are assigned two chambers 7 and 8 pressurizable with pressurizing agent for piston element 5 and chambers 9 and 10 for piston element 6. The assignment in the chambers 7 and 8 pressurizable with pressurizing agent takes place on both sides of piston element 5, regarded in the axial direction, so that the pressure in the chambers bears on a face 5.1 or 5.2 of piston element 5, or in the case of the chambers 9 and 10 pressurizable with pressurizing agent, face 6.1 or 6.2 of piston element 6. In this case, one of the chambers 7, 8 or 9, 10 always acts as a pressure chamber and the other as a compensating chamber. The individual piston element 5, 6 is guided in this case so that it can slide in the axial direction. The guidance takes place in a so-called piston hub 11, on which preferably both piston elements 5, 6 are situated non-rotatably, but are guided in the axial direction so that they can be slid at least indirectly in the axial direction. Piston hub 11 is executed in the simplest case as a hollow shaft 12, which is connected to the input of wet-running dual-clutch system 2 in a rotationally fixed connection. Chambers 7, 8, or 9, 10 are sealed with respect to the respective piston element 5, 6. At the same time, piston element 5 or piston element 6 forms a boundary wall of the individual chambers 7 through 10 pressurizable with pressurizing agent. In detailed terms, piston element 5 forms the first chamber 7 pressurizable with pressurizing agent, with its first face 5.1 and a housing part 13 that is connected to the piston hub in a rotationally fixed connection, while face 5.2 along with another stationary housing part 14 forms a second chamber 8 pressurizable with pressurizing agent, which preferably functions here as an equalizing chamber, while the chamber 7 pressurizable with pressurizing agent functions as a pressure chamber. By analogy, face 6.1 of piston element 6 together with stationary housing part 13 forms a chamber 10 that is pressurizable with pressurizing agent, which functions as an equalizing chamber; and with another stationary housing part 15, which is preferably made in a single piece with the piston hub 11, it forms the chamber 9 that is pressurizable with pressurizing agent, which functions here as a pressure chamber. The individual pressure chambers are connected via at least one connecting channel, in this case for example the connecting channels 16, 17, 18 and 19, to a pressurizing agent supply and transport system, in particular a pressurizing agent source or sink. Through this connecting channel, which is shown here merely by way of example, the supply and removal of pressurizing agent can be controlled in the chambers 7 through 10 correspondingly pressurized with pressurizing agent. It can be seen that actuating unit 1 is sealed off from the rest of the interior of wet-running dual-clutch system 2. The sealing is accomplished by sealing of the individual chambers 7 through 10 by means of sealing systems 70'. To that end, corresponding sealing devices are assigned to the individual elements. The first chamber 7 pressurizable with pressurizing agent is sealed by means of a first sealing device 32. The seal 32 is situated between a surface area 24 pointing in the radial direction to the center axis M, or a cylindrical part of piston element 5, and an area of the stationary housing part 13 pointing toward the outside. To that end, first sealing device 32 is situated in a groove 21 produced at the outer circumference of a cylindrical sub-area of housing part 13, and forms with its outer circumference 22 a sealing surface 23, which forms a sealing pairing with piston element 5, in particular the surface area 24 formed on piston element 5 and pointing in the radial direction to the central axis M. Sealing device 32 is an elastic sealing ring, which is exposed to a moving surface in interaction with surface area 24. Furthermore, the chamber 7 which is pressurizable with pressurizing agent is sealed off from chamber 8 by means of another sealing device 27 situated on the inner circumference 25 of piston element 5, preferably in the form of a simple sealing ring. The latter is placed in a groove 26 situated on the inner circumference 25 of the piston. The inner surface 28 of the seal then forms a sealing surface 29, which enters into operative connection with a surface area 30 on housing part 13 which is oriented accordingly in the radial direction and forms an outer circumferential surface, or with the piston hub 11, and forms the seal pairing. These statements also apply by analogy to the other chambers, in particular to chamber 8 which is pressurizable with pressurizing agent. The latter is sealed off from piston element 5 by a sealing device 33 inserted in the groove 20 situated on the inner circumference of the stationary housing part 14. Chamber 9 is sealed with sealing devices situated at a circumferential area of piston element 6 forming an inner circumference, in this case in particular the sealing device 34. To that end a groove 36 is provided on a sub-area 35 of housing part 15 forming an outer circumference, in which groove the sealing device 34 is situated. In the area of its inner circumference 37, piston element is sealed off from the connecting elements, in particular piston hub 11, by a sealing device 38. This sealing device is also inserted into a groove, which is produced at the inner circumference 37 of piston element 6. Chamber 10, which is pressurized with pressurizing agent, is sealed by a sealing device 40 which is placed between piston element 6 and the connecting element, here in particular the stationary housing part 13. To that end, a corresponding groove 41 is provided in the sub-area of piston element 6 that forms an outer circumference, and sealing device 40 is installed in that groove. A major problem of this design is that, when subjected to pressurizing agent optimal sealing conditions are no longer possible, as shown in FIG. 2*b* for chamber 9 pressurizable with pressurizing agent; instead sealing device 38 becomes distorted and leakage paths form. At the same time, sealing device 38 itself is deformed by the pressure in chamber 9 which is pressurizable with pressurizing agent, and is pressed in the direction of the other chambers or in the axial direction, so that sealing device 38 is no longer completely in groove 39 and in contact with the surface areas 39.1 through 39.3 formed by groove 39. The forces caused by the moving fluid press sealing device 38 inward in the radial direction, so that it comes into contact with piston hub 11 and forms an intermediate space or a groove on the side from which the pressure force is being applied. The sealing device is now pressed only in the direction of the pressure caused by the moving fluid and of the surface areas 39.2 lying in that direction and the outer circumference of piston hub 11; that is, in the depicted case, in the direction away from pressure chamber 9 and in the inward radial direction. The surface area 39.1 which is opposite the surface area 39.23 of groove 39 in the axial direction is freed of load under pressure, and is needed only to fix sealing device 39 axially in the non-loaded state.

The arrangements of sealing devices 27, 32, 33, 34, 38 and 40, in particular the size of grooves 20, 21, 26, 36 and 41 and their protection, is determined primarily by the size or the necessary material thickness of the connecting elements, in particular of the piston elements 5 or 6. To ensure their function, however, piston elements 5, 6 must be designed with the appropriate thickness in the area that carries the groove. In order to avoid this, according to the invention a sealing device 42 is situated in a grove 44 formed by the piston element, for example 5, and a retainer 43. The shape of groove 44 is dictated by the groove-forming area provided on piston element 5. On the face of piston element 5, in this case on the face 5.1, an open-edge recess in the form of an open-edge groove 45 is provided, with the groove 45 with one open side forming so to speak a radial contact surface 46 and an axial contact surface 47 for sealing device 42 on piston element 5, which can correspond for example to one of the sealing devices 27, 32, 33, 34, 38 or 40, and which is inserted in groove 45 and is secured in the axial direction by means of retainer 43 in the form of a thin sheet metal element 48. However, sheet metal element 48 is situated on the side that is under less load when under pressure, for example, which points in the operating direction of the pressure in the chamber that is pressurizable with pressurizing agent.

An example of an embodiment according to the invention is depicted in FIGS. 1a and 1b on the basis of a detail from a piston element 5. FIG. 1a depicts a detail to illustrate a version of piston element 5 in axial section with sealing system 70 constructed according to the invention. This can be sealing system 70, for example, which is situated in the area of the inner circumference 25 of piston element 5. Piston element 5 forms a contact surface 47 oriented in the axial direction for face 42.2 of sealing device 42, and a radial contact surface 46 pointing inward in the radial direction to the axis of rotation R of the clutch system or the center axis M of piston 5, which is congruent thereto, for a surface 42.3 of sealing device 42 which points to the latter in the radial direction. Face 42.1, which lies opposite face 42.2 of sealing device 42, is secured by sheet metal element 48, with the latter functioning as axial contact surface 51. FIG. 1b illustrates an enlarged detail from an axial section of piston element 5. It can be seen here how sheet metal element 48 is attached to the piston element as a so-called retaining plate. The connection 50 is preferably rotationally fixed and non-separable. In the depicted case a riveted joint 52 is provided, with the rivets extruded from piston element 5, for example, formed from the material of piston element 5. Preferably a uniform number of such connections 50 are provided in the circumferential direction of sheet metal element 48. Riveted joint 52 constitutes an example. Other options are conceivable, for example by spot welding. Sheet metal element 48 is executed as a disk-shaped element, in the simplest case without any deformation present; that is, the faces 48.1 and 48.2 of sheet metal element 48 are describable by two flat surfaces that are parallel to each other. Sheet metal element 48 has one face 48.2 in contact with piston element 5, in particular face 5.1 of piston element 5. In addition, another seal can be realized by way of this surface, in particular if the connection 50 is pressure-tight.

Figure 3:
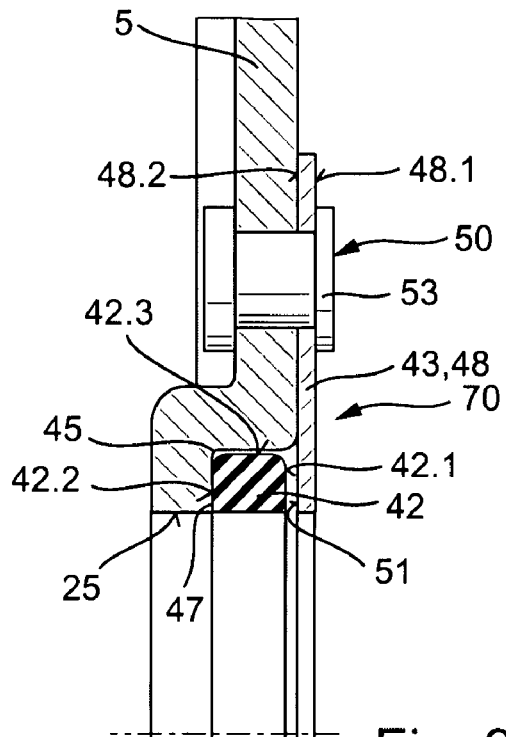
FIG. 3 shows a version of a sealing device designed according to the invention on the basis of a detail from an axial section of an actuating device according to FIG. 1b with conventional rivets.

While FIGS. 1a and 1b illustrate a design with rivets 52 extruded from piston element 5, FIG. 3 shows an alternative design according to FIG. 1b, with rivets 53 that pass through piston element 5 and sheet metal element 48 in the axial direction. The rivets 53 secure sheet metal element 48 in its axial position. Here too a plurality of rivets 53 are provided, preferably distributed uniformly in the circumferential direction.

Figure 4:
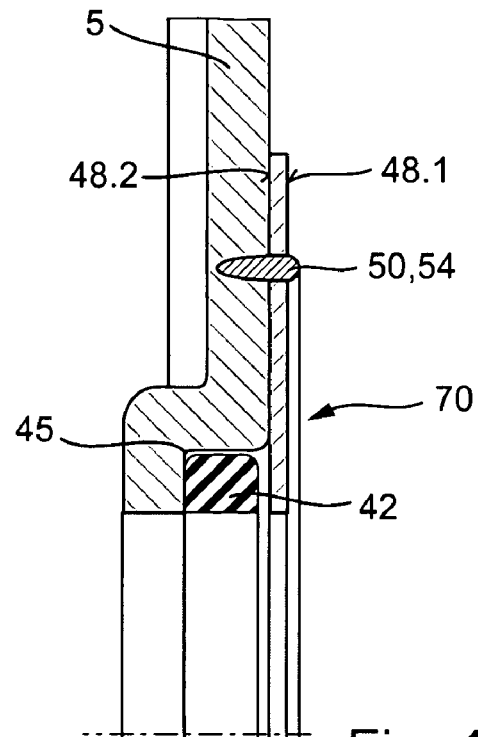
FIG. 4 shows a version of a sealing device designed according to the invention on the basis of a detail from an axial section of an actuating device according to FIG. 1b with a welded joint.

While FIG. 3 illustrates a design with rivets, FIG. 4 illustrates another design with a connection in the form of a materially bonded connection 54, which is preferably produced by laser welding. In this case the materially bonded connection can be realized in the circumferential direction with an uninterrupted seam or with spot welding all around. Here again the sealing device 42 is integrated into the groove 45 on piston element 5, which receives it completely in the axial direction and together with the retainer 43 describes the groove 44.

Figure 5:
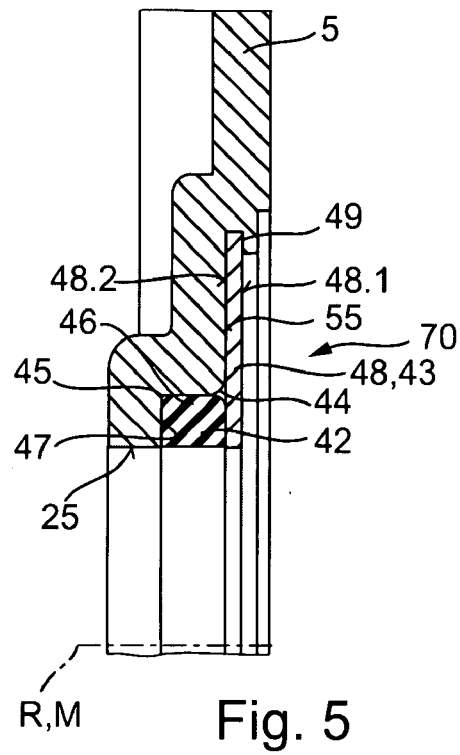
FIG. 5 shows a version of a sealing device designed according to the invention on the basis of a detail from an axial section of an actuating device according to FIG. 1b, with a retainer inserted in a groove on the actuating device by forming.

FIG. 5 illustrates a design with a connection produced by "stacking," for example, a sheet metal element 48 deformed under the effect of pressure and placed in a groove 49 that is situated parallel to the groove 45 on piston element 5. The arrangement of sealing device 42 in relation to the inner circumference 25 of piston element 5 is unchanged. Groove 49 also runs in the circumferential direction, when viewed in the radial direction; it has a larger diameter than groove 45 and is situated directly adjacent to the latter on piston element 5; that is, the contact surface 55 on piston element 5 for face 48.2 corresponds to the piston surface that bounds the radial contact surface 46 in the axial direction.

FIGS. 1 and 3 through 5 illustrate ways of shaping the groove 45 on piston element 5 through the shaping of piston element 5, in particular the transitions between individual areas. These are rounded in this case. The shaping of groove 45 or of the contact surfaces 47 and 46 of groove 44 on the piston element is accomplished without metal-cutting, for example by forming, in particular by deep drawing.

Figure 6:
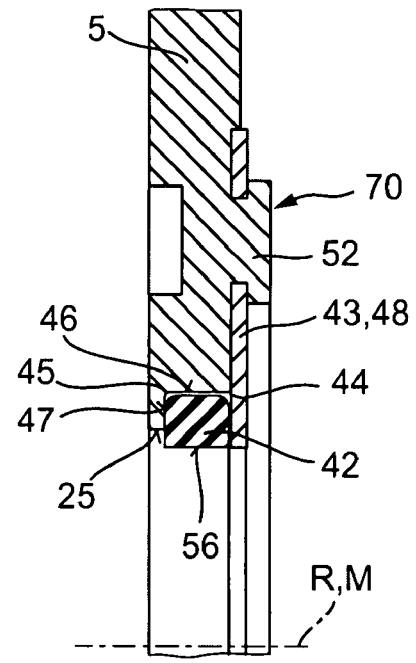
FIG. 6 shows a version on the basis of a detail from an axial section of an actuating device, with a groove embossed in the actuating device and rivets extruded from the actuating device.

FIG. 6 illustrates a version of forming the one-open-sided groove 45 on piston element 5 with contact surfaces 46 and 47 by stamping. In this case as well, the recess produced by stamping forms a contact surface 47 oriented in the axial direction and a contact surface 46 oriented in the radial direction. Furthermore, sheet metal element 48 is also provided here to fix sealing device 42 axially. The single-open-sided groove 45 or the groove 44 formed together with the sheet metal element 48 extends into the area of the inner circumference 56 of sealing device 42. Preferably it does not close flush with sealing device 42, but rather sealing device 42 protrudes from groove 44 slightly in the radial direction.

Figure 7A:
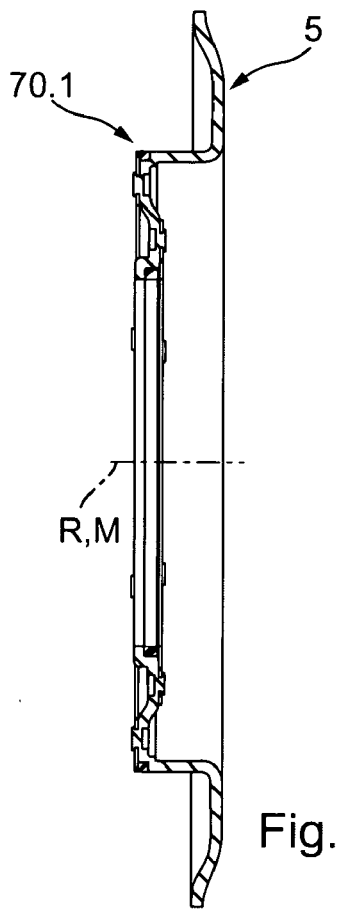
FIGS. 7a and 7b show a version with two sealing systems on the basis of an axial section and an enlarged depiction of a detail from the axial section.
Figure 7B:
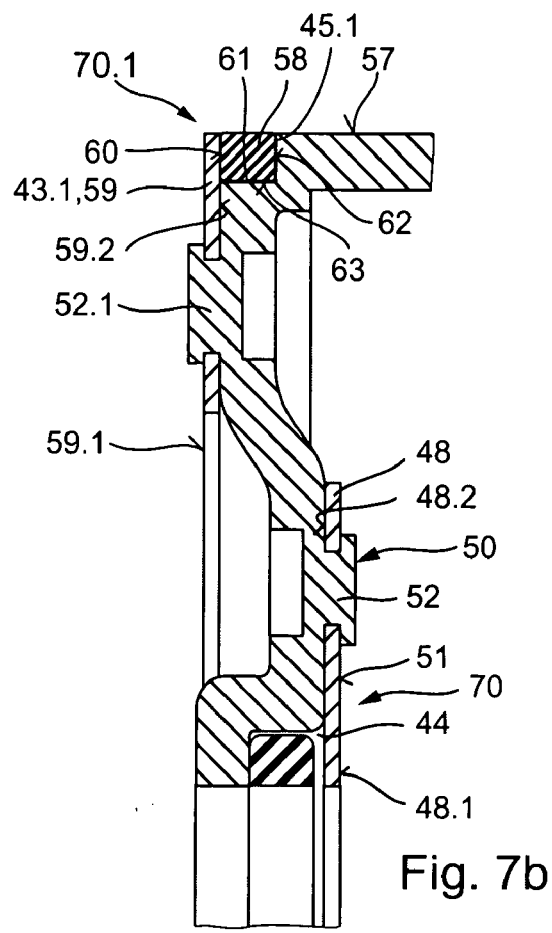

FIGS. 7 and 8 illustrate an axial section through a piston unit 5, with a first sealing system 70 situated at the inner circumference, which includes sealing device 42, and another second sealing system 70.1 with a sealing device 58, situated at the area that forms the outer circumference of piston element 5. FIGS. 7a and 8a illustrate an axial section through piston element 5, while FIGS. 7b and 8b illustrate an enlarged detail from the axial section. It can be seen from these that according to FIG. 7b both sealing devices 42 and 58 are secured in the axial direction by sheet metal elements 48 and 59, respectively. Sheet metal elements 48 and 59 are executed here by way of example as ring-disk-shaped elements. These lie with their ends 48.2 and 59.2, which in the installed position face piston element 5, against piston element 5 in the axial direction. Furthermore, these form contact surfaces 51 and 60 respectively in the area of their outer or inner circumference, for sealing devices 42 and 58. Sealing device 42 is situated in a groove 45 which is situated at the inner circumference 25 of piston element 5 and is open on one side and secured by retainer 43. Sealing device 58 is situated in a groove 45.1 which is situated at the outer circumference 57 of piston element 5 and is open on one side and secured by retainer 43.1. This groove is executed as an open-edged ring-shaped recess 61 and forms a first contact surface 62 formed in the axial direction on piston element 5 or contact surface 63 oriented in the radial direction for sealing device 58. The radial contact surface 46 for sealing device 42 is formed by a surface that points to the axis of rotation R, and thus a sub-area that describes an inner circumference, while the contact surface 63 oriented in the radial direction for sealing device 58 is formed by a sub-area that makes an outer circumference. The rotationally fixed coupling with the retainer 43, 43.1, in particular sheet metal element 48 or 59, is made here for example by a riveted joint 52, not using separate rivets but rivets extruded from piston element 5. These riveted joints are identified here as 52 for first sheet metal element 48 and as 52.1 for second sheet metal element 59. The individual rivets are preferably situated at a uniform offset from each other in the circumferential direction.

FIG. 7b illustrates a design with areas formed on piston element 5 with stamping, forming the axial and radial contact surfaces 62, 63 and 46, 47 that form the groove. In contrast, FIG. 8b illustrates a design in which the grooves 45 and 45.1 are formed along with piston element 5 in the same forming process. In other respects the basic structure and design correspond to the design depicted in FIG. 7b.

As explained earlier, the solution of forming a groove for the sealing device can be executed in the area of an outer or inner circumference by means of a separate sheet metal element 48, 59, which can be especially thin, and on the low pressure side of piston element 5. With regard to the concrete execution of sealing devices 42, 58 there are no restrictions. In the simplest case, the sealing device is a sealing ring. It can be a rectangular ring or an O-ring. Other seal shapes are also conceivable. The aim being to achieve a sealing pairing with a highly effective seal at an axial surface of the piston and a radial surface, which forms a continuous sealed area and permits no leakage flow. Sealing device 42.9 can be of U-shaped or L-shaped design, as shown in FIG. 9. Here again a differentiation can be made in forming the groove 45 between the formed design by shaping the piston element 5 during manufacturing, or else later through processes involving reforming or metal cutting processing, such as stamping for example. With regard to the manner of attaching sheet metal element 48 to piston element 5, all of the previously named options exist here also. By preference, non-separable connections are always chosen, however. FIG. 10 shows an additional embodiment of the invention. Here piston element 5 is put down in the area of sealing device 70. In other words: whereas in FIG. 9 piston element 5 has an essentially constant wall thickness when viewed in the radial direction, in FIG. 10 the wall thickness is reduced in the area of sealing device 70 to receive the sealing device.

Figure 11:
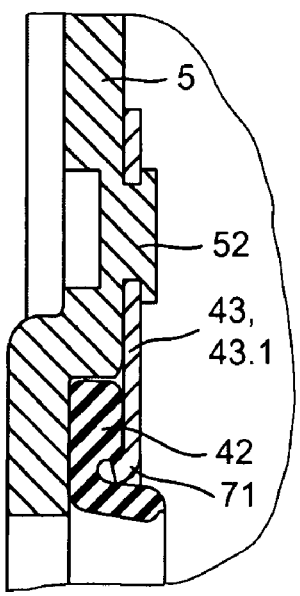
FIG. 11 shows a retainer with flaring.
Figure 12:
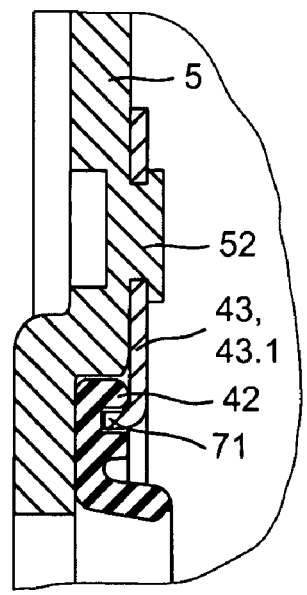
FIG. 12 shows a retainer with right-angle flaring.
Figure 13:
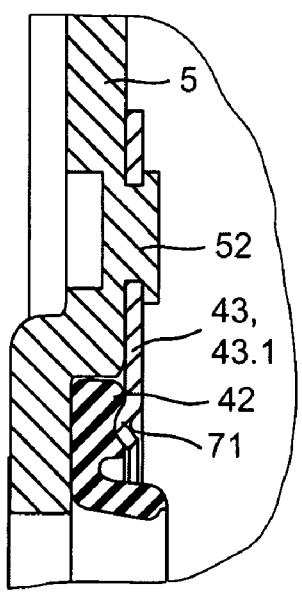
FIG. 13 shows a retainer with a bead.

FIGS. 11 through 13 show designs for fixing and/or aligning the sealing device 42. The sealing devices 42 are fixed and/or aligned here by forms of the retainer 43, 43.1. FIGS. 11 through 13 have the advantage that the sealing devices 42 are not guided, fixed or aligned by their outside diameter, or by the inside diameter of the cutout in piston 5. That does away with a possible expense for reworking the cutout in piston 5 after the stamping.

FIG. 11, retainer 43, 43.1 has flanging 71 in its radially inner area. This engages a circumferential groove in sealing device 42, which is situated between the main body and the sealing lip.

The flanging 71 is more pronounced in FIG. 12, so that it is oriented essentially perpendicular to the surface of retainer 43, 43.1. It can also be seen in the figure that there is an additional circumferential groove in the sealing device 42, and that the retainer does not engage the groove between the main body and the sealing lip, but that the retainer 43, 43.1 engages this additional groove.

In FIG. 13 the sealing device is realized by means of a circumferential bead in the retainer 43, 43.1. This has the advantage over the designs in FIGS. 11 and 12 that a rounded-off area of retainer 43, 43.1 comes to rest on sealing device 42. As a result, the sharp radially inner edges of the retainer do not come into contact with the soft material of sealing device 42, which prevents possible damage to sealing device 42.

REFERENCE LABELS 1 actuating unit
2 wet-running dual-clutch system
3 actuating device
4 actuating device
5 piston element
6 piston element
7 chamber pressurizable with a pressurizing agent
8 chamber pressurizable with a pressurizing agent
9 chamber pressurizable with a pressurizing agent
10 chamber pressurizable with a pressurizing agent
11 piston hub
12 hollow shaft
13 stationary housing part
14 stationary housing part
15 stationary housing part
16 connecting channel
17 connecting channel
18 connecting channel
19 connecting channel
20 groove
21 groove
22 outer circumference
23 sealing surface
24 surface area
25 inner circumference of piston element
26 groove
27 sealing device
28 inner surface
29 sealing surface
30 surface area
31 inner circumference
32 first sealing device
33 sealing device
34 sealing device
35 sub-area of piston element
36 groove
37 inner circumference
38 sealing device
39 groove
39.1, 39.2, 39.3 surface area
40 sealing device
41 groove
42, 42.9 sealing device
42.1, 42.2 face
43, 43.1 retainer
44 groove
45, 45.1 groove or recess open on one side
46 radial contact surface
47 axial contact surface
48 sheet metal element
49 groove
50 connection
51 contact surface
52 riveted connection
53 rivet
54 materially bonded connection
55 contact surface
56 inner circumference
57 outer circumference
58 sealing device
59 sheet metal element
60 contact surface
61 ring-shaped recess
62 contact surface
63 contact surface
70', 70, 70.1 sealing system
71 flanging
72 bead
R axis of rotation
M center axis
d thickness

What is claimed is:
1. A sealing system comprising:
at least one elastic sealing device for an actuating device operable by a pressurizing agent;

a chamber pressurizable with the pressurizing agent, in a dual clutch system; and an individual sealing device being located in a groove formed by the actuating device and a retainer, with at least two contact surfaces defining the groove being formed for the sealing device on the actuating device, wherein the retainer has flanging or a bead in a radially inner area facing the sealing device, the flanging or the bead engaging a circumferential groove in the sealing device aligning the sealing device radially and/or axially.

2. The sealing system as recited in claim 1 wherein the actuating device is a piston element.

3. The sealing system as recited in claim 1 wherein the retainer on a low pressure side of the chamber is located on the actuating device.

4. The sealing system as recited in claim 1 wherein the retainer is a sheet metal element, thickness of the sheet metal element and the thickness of the actuating device in the area forming the groove being at a ratio of 1:5 to 1:7.

5. The sealing system as recited in claim 1 wherein the area on the actuating device forming the groove forms at least one axial and one radial contact surface for the sealing device.

6. The sealing system as recited in claim 5 wherein the individual contact surfaces on the actuating device are formed by the shaping during fabrication of the actuating device.

7. The sealing system as recited in claim 6 wherein the shaping is by forming.

8. The sealing system as recited in claim 5 wherein the contact surfaces are stamped.

9. The sealing system as recited in claim 5 wherein the contact surfaces are incorporated through subsequent metal-removing processing on the actuating device.

10. The sealing system as recited in claim 4 wherein the sheet metal element forms a contact surface in the axial direction.

11. The sealing system as recited in claim 4 wherein the sheet metal element is executed as a ring-disk-shaped element with a flat axial contact surface on the actuating device.

12. The sealing system as recited in claim 4 wherein the sheet metal element is connected to the actuating device in a rotationally fixed connection.

13. The sealing system as recited in claim 12 wherein the rotationally fixed connection is separable.

14. The sealing system as recited in claim 13 wherein the rotationally fixed connection is a frictional or a positive-lock connection.

15. The sealing system as recited in claim 12 wherein the rotationally fixed connection is non-separable.

16. The sealing system as recited in claim 15 wherein the rotationally fixed connection is a positive-lock connection.

17. The sealing system as recited in claim 16 wherein the rotationally fixed connection is a riveted joint, the riveted joint being formed by separate rivets or rivets extruded from the actuating device.

18. The sealing system as recited in claim 15 wherein the rotationally fixed connection is a materially bonded connection.

19. The sealing system as recited in claim 18 wherein the materially bonded connection is by spot welding.

20. The sealing system as recited in claim 12 wherein the connection between the sheet metal element and the actuating device is located at a slight distance from the groove.

21. The sealing system as recited in claim 1 wherein the sealing device is a radial seal.

22. The sealing system as recited in claim 1 wherein the flanging is oriented at right angles to the radially inner area of the retainer.

23. The sealing system as recited in claim 1 wherein the flanging or the bead engages a circumferential groove in the sealing device located between a main body and a sealing lip of the sealing device.

24. The sealing system as recited in claim 1 wherein the flanging or the bead engages a circumferential groove in the sealing device, which is located in addition to the circumferential groove between the main body and the sealing lip of the sealing device.

25. A dual clutch system comprising:
at least one input and two outputs;
two clutch devices located between the input and a respective one of the two outputs, each clutch having an input part and an output part that can be brought into operative connection by an actuating device operated by a pressurizing agent;
at least one of the chambers that is pressurizable with pressurizing agent being assigned to the actuating device; and
further comprising the sealing system as recited in claim 1 being located between the actuating device and a housing wall of the chambers.

* * * * *